Feb. 1, 1966        A. L. POARCH        3,232,494
              VALVE SYSTEM COMBINATION
Filed April 27, 1964                   3 Sheets-Sheet 1

INVENTOR:
ARCHIE L. POARCH
BY A. John Michel
ATTORNEY

Feb. 1, 1966 A. L. POARCH 3,232,494
VALVE SYSTEM COMBINATION
Filed April 27, 1964 3 Sheets-Sheet 2

INVENTOR:
ARCHIE L. POARCH
BY d. John Michel
ATTORNEY

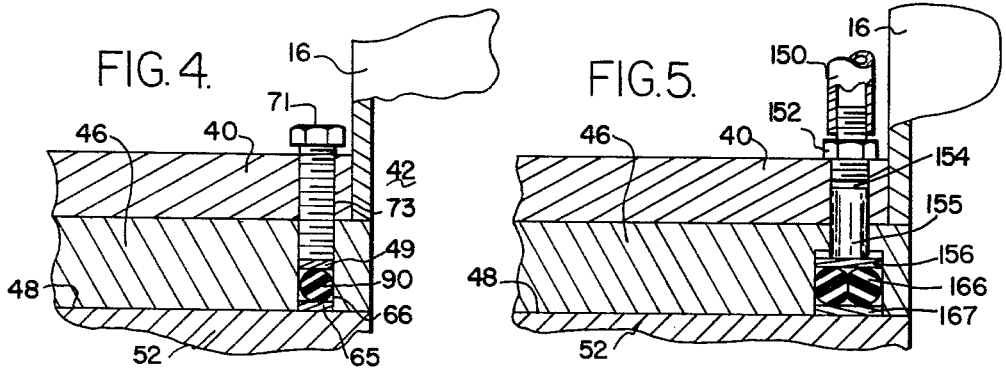
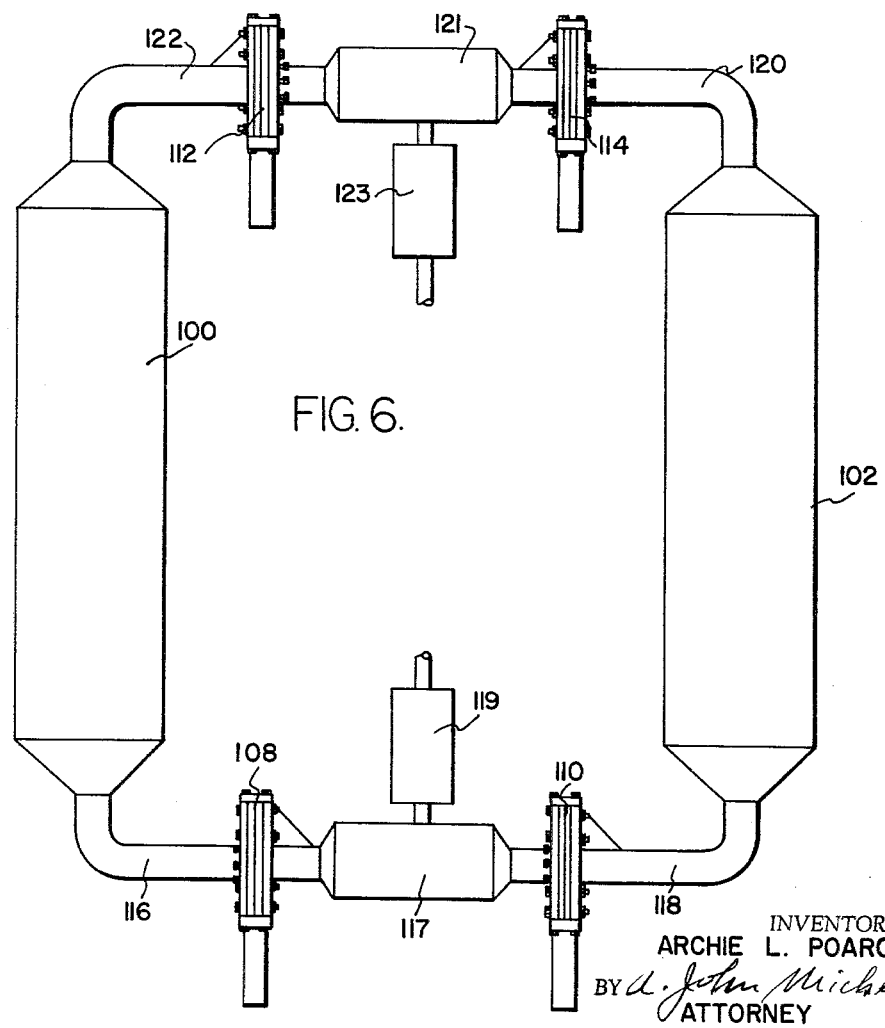

United States Patent Office 3,232,494
Patented Feb. 1, 1966

3,232,494
VALVE SYSTEM COMBINATION
Archie L. Poarch, P.O. Box 1625, Scottsdale, Ariz.
Filed Apr. 27, 1964, Ser. No. 362,916
7 Claims. (Cl. 222—193)

This application is a continuation-in-part of co-pending application Serial No. 232,001 filed October 22, 1962, now abandoned.

The present invention relates to valve systems, and more particularly to improved valve systems adapted to handle a variety of solid and/or fluid materials, including the feeding of granular or powdery materials through a reactor or the like in which such materials are processed by gaseous fluids at elevated temperatures and pressures.

It has been a problem to provide satisfactory valve systems for feeding abrasive materials into processing reactors under heat and pressure without permitting leakage of gas or fluid through the material or through the valves as the material is fed through the system.

It is therefore an object of this invention to provide novel valve structures for conveying granular materials through a valve system under pressure without fluid leakage.

Another object of the invention is to provide novel methods of and means for conveying both abrasive and fluid materials through a pipe system adapted to be sealed against leakage of hot gases under pressure into the atmosphere.

Another object of the invention is to provide a novel valve system comprising a plurality of slide valves in series and means alternately to operate such valves so that at least one of them is closed at all times while successive operation of such valves permits the flow of granular materials through the system without permitting substantial leakage of fluids through such materials or into the atmosphere.

A further object of this invention is to provide a valve system of the type contemplated which will prevent mechanical seizure of its moving parts when subjected to the deleterious contact effects of abrasive materials.

A still further object of this invention is to provide a valve system in which the movable metallic components are resistant to the combined deleterious effect of hot reducing gases and abrasive materials.

Further objects and advantages of the invention will be apparent from the following specification and accompanying drawings, in which:

FIG. 4 is an enlarged fragmentary sectional view taken on the same plane as that of FIG. 2 but showing a part thereof on an enlarged scale;

FIG. 5 shows a modification of FIG. 4;

FIG. 6 is a schematic view of a modified embodiment of the invention.

Figure 1:
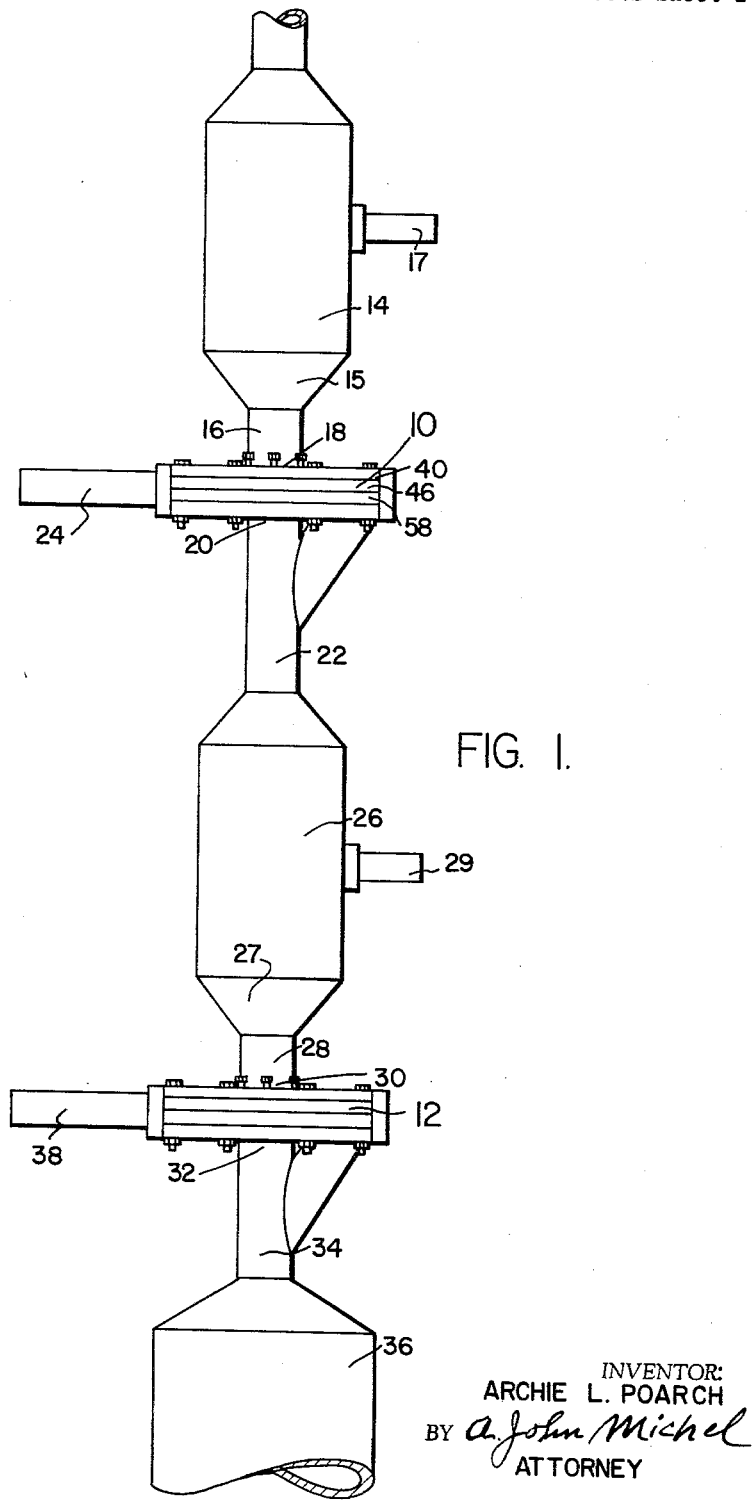
FIG. 1 is a diagrammatic view of the valve system of one embodiment of the invention.

Referring now more particularly to the drawings, the valve system of the invention comprises valve mechanisms 10 and 12 (FIG. 1) which may be substantially identical in construction. Disposed above valve 10 is an enlarged conduit section or chamber 14 which communicates through reduced conduit section 15 with pipe section 16 therebelow. Section 16 communicates with an inlet 18 of the valve mechanism 10 which is provided with an outlet 20 communicating with conduit 22. The valve 10 is provided with a reciprocating slide plate 52 (FIG. 2) and an actuator 24 which may be either a fluid operated cylinder or any other motorized reciprocating device.

Communicating with the reduced conduit 22 and disposed therebelow is an enlarged section or chamber 26 similar to chamber 14. Chamber 26 is connected to a section 28 similar to section 16, and section 28 communicates with an inlet 30 of the valve mechanism 12. Valve 12 is similar to valve 10 and is provided with an outlet 32 similar to the outlet 20 of valve 10. Outlet 32 is connected to conduit 34 which leads into reactor 36 adapted to process materials such as crushed ore or other granular materials, and/or various fluids, including hot gaseous fluids.

The valve mechanism 12 is provided with a reciprocating power-operated actuator 38 similar to actuator 24 of valve mechanism 10.

In general, the valve system of the invention operates to permit crushed ore or other granular materials to flow through the various conduit sections into the reactor 36 in such a manner that valves 10 and 12 are alternately opened and closed, at least one of them being closed while the granulated material flows toward the reactor 36, and thus prevents the escape of gaseous materials or fluids through the column of materials.

Several of the valves 10 and 12 may be disposed in series, and inasmuch as these valves are substantially identical, only valve 10 will be hereinafter described in detail.

The valve 10 (FIG. 2) comprises an upper plate 40 having an inlet opening 42 with which the inlet conduit 16 communicates thus forming the inlet 18 of the valve 10.

The inlet 18 communicates with an opening 44 in a bearing plate 46 adjacent the plate 40. This bearing plate 46 is provided with a bearing surface 48 which contacts upper surface 50 of a slidable valve plate 52 having a central opening 54 therein which is adapted to align with the inlet 18 and the opening 44 in the plate 46.

Lower surface 56 of the valve plate 52 is adapted to slide on an upper surface 56 of a second bearing plate 58 which is provided with a central opening 60 therein which aligns with the opening 44 in the bearing plate 46.

A lower frame plate 62 is coupled to the conduit section 22 and is provided with a central opening 64 forming the outlet 20 of the valve 10.

The space defined by the lower surface of plate 46, the upper surface of plate 58, the end plates 75 and 81, and the lateral ledges 78 and 80 form the valve chamber within which the slide valve 52 is adapted to move.

Figures 2, 3:
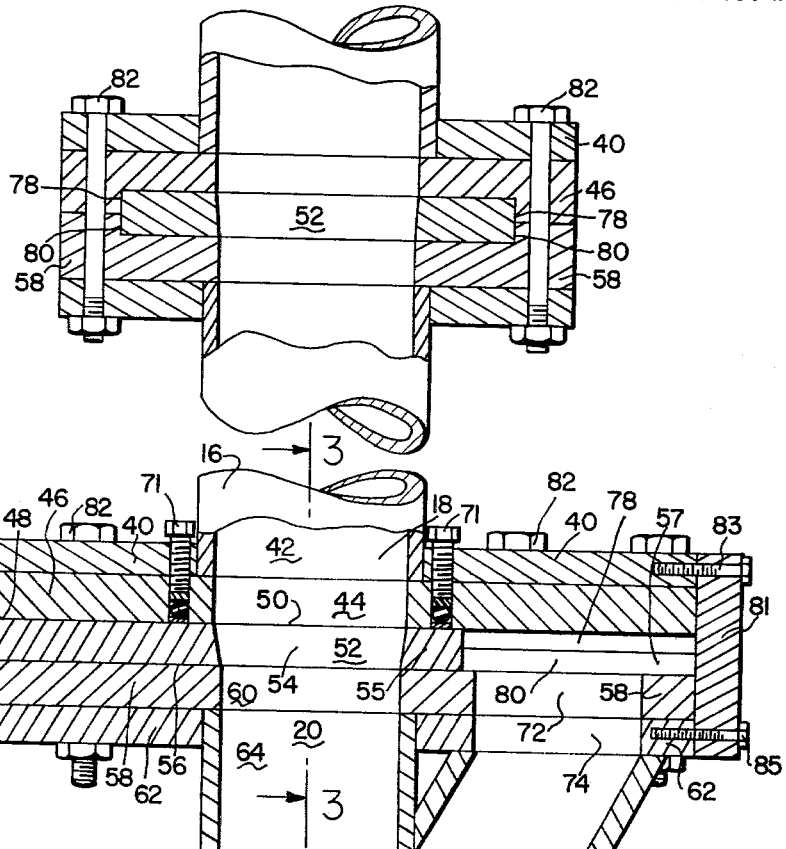
FIG. 2 is an enlarged fragmentary vertical section through one of the valve mechanisms of the valve system shown in FIGURE 1 of the drawings.
FIG. 3 is a fragmentary sectional view taken along line 3—3 of FIGURE 2.

As shown in more detail in FIGURES 2 and 4, the slide valve plate 52 is engaged at its upper surface 48 by a ring-type seal 65 disposed in an annular groove 66 of the plate 46. An O-ring 90 bears upon the seal ring 65 and resiliently holds the seal ring 65 in intimate contact with the upper surface 48 of the valve plate 52. A second seal ring 49 is compressively engaged with the O-ring 90. Set screws 71 threaded in the plate 40 are provided to adjustably exert pressure upon the seal ring 49. The screws 71 extend through threaded openings 73 communicating with the groove 66 in the plate 46. Pressure of the screws 71 on the O-ring 90 tends to hold the lower surface 56 of the valve plate 52 in contact with the upper surface of the bearing plate 58, whereby the valve will be effectively sealed against the escape of fluids or gases around the slide plate 52 and back into the inlet 16. This efficient sealing mechanism for the valve is particularly important in a system wherein high temperature and high pressure processing may be accomplished with volatile fluids, such as catalysts or other materials in a reactor. Furthermore, whereas in the case of low or medium pressure in the pipe system, the pressure regulation may be effected manually by means of set screws 71, in the case of high internal pressures, this invention provides means for fluid pressure to be exerted upon the seal ring; this fluid pressure may be obtained either by compressed air or by any gas under pressure including the gases of reaction in the reactor or conduit system, as follows:

Referring more particularly to FIG. 5, which represents a cross section along the same plane as that shown in FIG. 4, there is shown a tubular member 150 threadedly secured to the inlet nozzle 152 communicating with a chamber 154 containing plunger or piston 155. The tube 150 is connected to a source of gas under pressure (not shown) such as an air compressor, or a reacting vessel shown on FIG. 6 or any part of the pipe system shown, having sufficient gas pressure so that when the pressure is applied to the plunger 155, it will exert such pressure upon elements 156, 166, 167, and thus counteracts or balances the pressure within the valve chamber 54.

The sliding movement of the valve plate 52 is accomplished by plunger shaft 70 (FIG. 2) operated by actuator means 24. This actuator 24 may be an air cylinder and the shaft 70 may constitute the plunger of the air cylinder. An end plate 75 supports the cylinder 24 and is secured to the plates 40 and 62 by screws 77 and 79. An O-ring 67 provides a common seal for the entire end structure of the valve, and the plate 75 which bridges the bearing plates 46 and 58 additionally seals the end of the valve slide plate 52.

Another end plate 81 is secured by screws 83 and 85 to the plates 40 and 62 respectively, and thus seals the opposite end of the various plates, so that the entire valve structure is sealed at the lateral ends thereof.

The shaft 70 actuates the slide valve plate 52 back and forth between the bearing plates 46 and 58 so that the opening 54 in the valve plate may be moved into coincidence with an opening 72 in the bearing plate 58, opening 72 being disposed laterally of the central opening 54 therein. When the opening 54 is in coincidence with the opening 72, a solid portion of the valve plate 52 closes the openings 44 and 60 of the bearing plates 46 and 58, so that flow through the conduit sections 16 and 22, or the escape of gas or fluids therethrough, is prevented. Further, whenever the valve plate 52 is thus actuated, materials carried in the opening 54 are deposited through aperture 72, into the conduit 76 which conducts them back into the main conduit 22.

Adjacent the opening 54 in the valve slide 52 is a solid end structure 55 which is adapted to pass beyond the opening 72 and into part 57 of the valve chamber between the plates 46 and 58. When the valve is actuated to the right, the end structure 55 moves through the valve chamber without jamming material therein.

In this manner, the valve is permitted freely to operate with granular materials or various materials during a time when the entire conduit sections 16 and 22 are full and when the openings 44 and 60 of the bearing plates 40 and 58 are also full of material.

When valve 10 is open, valve 12 will be closed, and vice versa; in this manner, valuable processing materials do not escape from the reactor 36 during the feeding of granular material into the reactor.

The cycle rate of the valves 10 and 12 may be increased for increased flow of materials therethrough and alternate action of these valves is coordinated either by electrical or pneumatic control systems, as known in the art.

As shown in FIG. 2, the opposite longitudinal edges of the valve plate 46 are enclosed by ledge portions 78 and 80 of the bearing plates 46 and 58, respectively. The ledge portions 78 and 80 are of a combined thickness slightly greater than the thickness of the slide valve plate 52 so that sufficient clearance is provided for the sliding of plate 52 in the valve chamber. Screws 82 hold plates 46 and 58 together at their ledges 78 and 80 and thus provide an effective seal along these ledges while allowing sufficient spacing for proper sliding operation of the valve plate 52 between the bearing plates 46 and 58.

To prevent seizing and other deleterious effects of the environment upon the valve parts, such as erosion, the inner surfaces of the valve chamber are preferably made of an alloy of the nickel-chromium group of metals which exhibits a hardness of about 25 Brinell greater than the hardness of the slide valve 52 moving therein. The slide valve itself is preferably composed of an alloy of the bronze or non-ferrous groups of metals which is compatible with the nickel-chromium group of alloys used for the walls of the valve chamber.

By removal of the screws 82, the seal ring 65 and/or the bearing plates 46 and 58 may be replaced when and if excessive wear has occurred.

As shown in FIG. 1 of the drawings, the conduit sections 14 and 26 are provided with converging portions 15 and 27. These portions tend to cause granular materials to bridge at these portions and thus prevent long column material pressure on the upper portion of each respective valve 10 or 12.

Vibrators 17 and 29 in chambers 14 and 26, respectively, are preferably controlled to operate intermittently; they are adapted to cause vibration of the material to force it downwardly through the converging portions 15 and 27 only when the slide plate of the corresponding valve is open as shown in FIG. 2. When the plate is closed with the opening 54 coinciding with the opening 72, the operation of the corresponding vibrator is discontinued. Thus, when the valve is closed, only short column material loading can occur.

The vibrators 17 and 29 thus alternate with alternate operation of the actuators 24 and 38 and alternate opening and closing of the valve plates of valves 10 and 12. The alternate operation of the valves provides effective flame arresting means in the event combustible fluids are used in the system.

The valve system, including the valves 10 and 12 above the reactor 36, may be used to control the inlet of materials into the reactor, and a similar series of valves may be used in accordance with the present invention below the reactor 36 to control the outlet of materials from the reactor 36 and to conserve the gases operating as catalysts or other chemical reactants. Thus the invention comprises the valves in series at the inlet above the reactor 36 to form an outlet to remove granular material from the reactor 36 after it has been processed.

With high pressure and high temperature operation in the processing of ore or other granular materials in the reactor 36, the efficient sealing of the valves 10 and 12 is important to conserve valuable fluids and also to permit rapid feeding of the valves and the concurrent operation of the vibrators 17 and 29. The valves may be operated rapidly due to the low column loading provided by the bridging converging structures 15 and 27; the vibrators 17 and 29 tend to break this bridging effect at the time when the valves are open and ready to receive a flow of materials therethrough.

It will be understood that whereas the embodiment of the invention described with reference to FIG. 1 of the drawings discloses a column type of operation including more specifically a gravity flow of the materials through the system, the present invention, in its broad aspect, is in no manner or degree limited to such gravity or vertical flow of materials, but it definitely includes those modifications of the invention in which the flow of the materials is obtained by means such as pressure transfer in a horizontal direction, or in any direction intermediate to horizontal and vertical. Also, various other applications of this invention will suggest themselves to those skilled in the art, such as for example the dehydration of natural gas, using aluminum oxide or silica gel as dehydrating agent.

Referring now more particularly to FIG. 6 of the drawings, there is shown in a schematic manner a valve system including reaction vessels 100 and 102, valve mechanisms 108, 110 and 112, 114, respectively, and chambers 117, 121, similar to the corresponding parts of FIGURES 1 through 4. In this modification of the invention, the force required for moving the powdered materials through horizontal pipe sections 116, 118 and 120, 122, as well as through the valves 108, 110, and 112, 114 is supplied by the pressure of the reaction gases in reactors 100 and 102. The pressure in reactor 100 is usually sufficient to force the powdered materials therein forward into chamber 117, whence, if necessary, external air or inert gas, supplied additionally thereto at 119, forces the materials forward again, at the opening of valve 110, into reactor 102.

In a similar manner, the pressure of the gases of reaction in reactor 102 may be sufficient to force the powdered materials forward into chamber 121. If additional force is required, it is supplied by the pressure of the external air or gas injected into chamber 121 by means of source 123; this force must be sufficient to overcome the pressure encountered in vessel 100 plus the friction losses encountered in valve 112.

The rate of flow of the materials can be readily controlled by the time period of the opening and closing of valves 108, 110, and 112, 114 respectively.

Various other modifications of the present invention may be effected in a manner limited only by the following claims.

I claim:
1. In a valve system for treating and transferring granulated material from one reactor vessel to another reactor vessel under selected gaseous and thermal conditions, the combination of conduit means disposed to provide for flow of materials therethrough; gas pressure means for propelling said materials through said conduit; valve means disposed in spaced relationship with each other for controlling the flow of said material through said conduit, said valves having slidable shut-off means to close or open said conduit means; means adapted to alternately operate said slidable means to open and closed positions to prevent valuable reactants from escaping through said conduit means; means for the intermittent storage of said materials in the proximity of each of said valves; vibrators for feeding materials downwardly through said storage means; a valve chamber for each of said valves; said slidable means being adapted to operate in said valve chamber; means for sealing said valve chamber against the outside atmosphere whereby the pressure conditions of the internal atmosphere of said system may be effectively controlled, said means for sealing said valve chamber comprising a plurality of ring like members of varying degrees of physical strength and hardness, and means for applying pressure to said plurality of rings.

2. The combination as claimed in claim 1 in which means are provided for applying fluid pressure upon said plurality of rings.

3. In a valve system the combination of: a main conduit disposed to provide for a flow of granular materials therethrough a plurality of valves in said conduit disposed in spaced relationship with each other for dispensing material through said conduit, said valve means having control means disposed to close or open said conduit means, and means disposed to alternately operate said plurality of valves to produce flow of materials through said conduit but alternately to shut-off flow through said conduit to prevent volatile materials or fluids from escaping, at least one processing reactor communicating with said main conduit, each of said control means having a slidable plate member provided with an opening therein adapted to align with said main conduit means and to permit said materials to flow therethrough; a casing for said slide plate having a lateral conduit section integral with said casing and adapted to receive materials carried in the opening of said slide valve plate when said plate is moved toward closed position, whereby said valve may be filled with granular materials and materials carried in the opening of the slide plate may be moved laterally to said lateral conduit, said lateral conduit communicating with said main conduit downstream from said valve; and a reciprocating power-operated actuator for alternately sliding said slide plate into open and closed positions.

4. The combination, as claimed in claim 3, in which there are provided material supply chambers for said reactors, and vibrating means in said supply chambers to cause vibration of said powdered material and to prevent clogging thereof in said conduit.

5. In a valve system the combination of: main conduit means to provide for flow of granulated materials therethrough; a source of gas under pressure for conveying said materials through said conduit; a plurality of valves in said conduit disposed in spaced relationship with each other for controlling the flow of material through said conduit, said valves having shut-off means disposed to close or open said conduit; and reciprocating actuating means to alternately operate said valves to permit flow of materials through said conduit but to shut-off flow through said conduit means to prevent fluids from passing counterstream through said conduit; a processing reactor communicating with said conduit means below said valves; each of said valves having an apertured slide plate member provided therein disposed to align with said conduit means and to permit materials to flow therethrough intermittently; a casing for said slide plate means having a lateral conduit section disposed to receive materials carried in the aperture of said slide plate when moved toward closed position, whereby said valve may be filled with granular materials, and materials carried in said aperture may be moved laterally to said lateral conduit; said lateral conduit being adapted to discharge into said main conduit below said valve; a shaft for said reciprocating valve actuating means; a seal surrounding said shaft and plate surrounding said seal and secured to said body for sealing said slide plate and shaft against the atmosphere.

6. The combination as claimed in claim 3, in which there is provided at least one additional source of gas or air under pressure, said additional source being adapted to boost the pressure supplied by said first source of gas in such a manner as to act upon the granulated material at a point at which increased pressure is required for the forward movement of said materials.

7. In a valve system the combination of: conduit means disposed to provide for gravity flow of materials therethrough; a plurality of valves in said conduit means disposed in spaced relationship with each other for dispensing material through said conduit means, said valve means having shut-off means disposed to close or open said conduit means, and means disposed to alternately operate said plurality of valves to permit gravity flow of materials through said conduit means but alternately to shut-off flow through said conduit means to prevent volatile materials or fluids from passing upwardly through said conduit means; a processing reactor communicating with the lower portion of said conduit means below said valves, each of said valves having a slide plate member provided with an opening therein disposed to align with said conduit means and to permit materials to flow therethrough, a body for said slide plate means having a lateral conduit section disposed to receive materials carried by the opening of said valve plate, means when moved toward closed position whereby said valve may be filled with granular or other materials, and materials carried in the opening of the slide plate may be moved laterally to said lateral conduit, said lateral conduit communicating with said conduit means below said valve, a reciprocating power operated actuator in connection with said valve slide plate, a shaft for said reciprocating power operated actuator; a seal surrounding said shaft; a plate surrounding said seal and secured to said body for sealing around said slide plate and said shaft; a second seal plate at the opposite end of said body and said slide plate.

References Cited by the Examiner

UNITED STATES PATENTS

| | | | |
|---|---|---|---|
| 2,448,816 | 9/1948 | May | 251—368 X |
| 2,666,539 | 1/1954 | Avery. | |
| 2,746,375 | 5/1956 | Abbott et al. | 222—196 X |
| 2,875,345 | 2/1959 | Nicoll. | |
| 2,926,884 | 3/1960 | Clinkenbeard | 251—368 X |
| 3,090,593 | 5/1963 | Pro | 222—450 X |
| 3,119,529 | 1/1964 | Maestrelli | 222—450 X |

LOUIS J. DEMBO, *Primary Examiner.*